United States Patent [19]

Lauria

[11] Patent Number: 5,404,905
[45] Date of Patent: Apr. 11, 1995

[54] BACKFLOW PREVENTER WITH FAILURE INDICATOR

[76] Inventor: Thomas J. Lauria, 398 Mayer Ct., Ridgefield, N.J. 07657

[21] Appl. No.: 233,044

[22] Filed: Apr. 25, 1994

[51] Int. Cl.⁶ .......................................... F16K 37/00
[52] U.S. Cl. .................................. 137/557; 137/312; 137/613
[58] Field of Search .................. 137/557, 312, 613

[56] References Cited

U.S. PATENT DOCUMENTS

| | | | |
|---|---|---|---|
| 2,587,960 | 5/1952 | Bletcher et al. | 277/61 |
| 2,587,961 | 5/1952 | Bletcher et al. | 277/61 |
| 3,028,877 | 4/1962 | Thieme | 137/557 |
| 3,376,884 | 4/1968 | Bucknell et al. | 137/119 |
| 3,860,033 | 1/1975 | Grove et al. | 137/557 |
| 3,905,392 | 9/1975 | Gray | 137/557 |
| 4,043,355 | 8/1977 | Cerruti et al. | 137/557 |
| 4,071,045 | 1/1978 | Brandt | 137/528 |
| 4,271,862 | 1/1981 | Snoek | 137/511 |
| 4,271,863 | 6/1981 | Bishop | 137/557 |
| 4,271,864 | 6/1981 | Neff | 137/599 |
| 4,290,446 | 9/1981 | Seiler | 137/557 |
| 4,395,018 | 7/1983 | Moen | 251/310 |
| 4,706,705 | 11/1987 | Lee | 137/514.5 |
| 4,706,706 | 11/1987 | Page et al. | 137/527.8 |
| 4,991,655 | 2/1991 | McHugh | 137/557 |
| 5,148,828 | 9/1992 | Farnham | 137/454.6 |
| 5,195,552 | 3/1993 | Nehm | 137/269 |
| 5,203,872 | 4/1993 | Naffziger | 251/82 |

OTHER PUBLICATIONS

Nupro "50" Series Lift Check Valve (Aug., 1990) N-189-3 1 page Jan. 1993.
Metraflex "Silent Check Valves" (Catalog page from Mechanical Products Catalog) 1 page Jan. 1990.
PTO Disclosure Document 389536 dated Aug. 21, 1991.
Author (Applicant) 6 total pages Title: Backflow Preventer with Visual Failure Indicator.
Watts Regulator Company "Backflow Prevention Products" Catalog Binder and Material. All Sections and catalogs relevant except price lists, Jan. 1993.

Primary Examiner—A. Michael Chambers

[57] ABSTRACT

A backflow prevention device with a failure indicator designed to determine the functional state of integral backflow prevention device(s) or check valve(s). Check valve(s) are assembled in combination with pressure gauge(s) or failure indicator(s) and valve(s) or flow regulation device(s) between an inlet area and outlet area, and is designed to allow a working fluid to flow in the desired direction of fluid flow and prevent backflow. A built in test or procedure enables the functional condition of backflow prevention device(s) or check valve(s) to be determined readily, easily, and reliably.

8 Claims, 4 Drawing Sheets

BACKFLOW PREVENTER WITH FAILURE INDICATOR

BACKGROUND - FIELD OF INVENTION

This invention relates to backflow prevention, which deals specifically with preventing fluid flow in an undesired direction.

BACKGROUND - DESCRIPTION OF PRIOR ART

Backflow preventers are devices which are designed to allow a working fluid or fluid to pass through in the desired direction of fluid flow; they are designed to prevent backflow-fluid flow in an undesired or reverse direction. Two conditions which tend to drive fluid flow in the reverse direction include backpressure and backsiphonage. Backpressure is the condition by which fluid pressure increases downstream of the device. Backsiphonage is the condition that occurs when the fluid's supply pressure drops. For example, backsiphonage may occur when a water main breaks; there is a large draw on a water main such as when fire fighters are pumping water to extinguish a fire; a fluid pump fails in a building; a water closet is flushed; etc. Flow in a reverse direction is often not desired since it may involve contamination of the fluid's source with foreign elements or contaminants.

There are a wide variety of devices which deal with preventing backflow from occurring. A simple device called a check valve is often used to prevent backflow. Such a device often includes a moveable member made of rubber, metal, or other material which seats against a fixed member, when a backflow-causing condition occurs. Ideally this seal prevents backflow. A variety of check valves exist. For example, U.S. Pat. No. 4,706,705 to Lee (1987) is a spring-loaded version. Other versions include U.S. Pat. No. 4,071,045 to Brandt (1978) and U.S. Pat. No. 4,271,862 to Snoek (1981). U.S. Pat. No. 3,376,884 to Bucknell and Ward (1968) is a check valve/fluid flow diverter combination. Practically, however, the backflow preventer's seating member often deteriorates or otherwise becomes fouled or functionally impaired with normal usage. Thus, if functionally impaired, a check valve will not prevent backflow from occurring. Furthermore, whether or not the check valve is functional often remains unknown.

To offer additional protection against backflow, two check valves in tandem, called a double check valve, are often used. However, double check valves are of little more value than lone or single check valves; if operating conditions cause one check valve to become functionally impaired, they will likely have the same effect on the second check valve.

A third type of backflow preventer is the reduced pressure zone assembly. Reduced pressure zone backflow preventers often consist of a pressure differential relief valve located between two check valves. Reduced pressure zone backflow preventers are complicated devices which can only be functionally tested using a separate test kit, and a complex test procedure. Generally, a certified expert in testing backflow preventers is required to perform a detailed functionality test on the reduced pressure zone backflow preventer. A further disadvantage of reduced pressure zone backflow preventers is that the test kit's gage or gages often require frequent calibration to ensure accuracy of the test's measurements. Similar to that of the reduced pressure zone test is that for the double check valve, previously mentioned.

Vacuum breakers, or vents to the atmosphere, attempt to prevent backflow by opening a passage or vent to the atmosphere under the backflow-causing condition of backsiphonage. When backsiphonage occurs, a vacuum breaker often attempts to allow atmospheric pressure air to be drawn into the working fluid's supply line, rather than drawing fluid or contaminant. However, the air ports of such devices can often become clogged, causing restriction. This leads to a deterioration of their intended abilities leaving little, if any, residual benefit. In addition, the working parts of a vacuum breaker often deteriorate with normal use and the device can become functionally impaired or otherwise fouled. Accordingly, such a device will not accomplish its desired function of preventing backflow.

Some backflow preventers may be comprised of combinations of the above described devices. A dual check valve assembly with an integral vacuum breaker is one such example. However, this redundancy accomplishes little additional protection against backflow in light of their individual flaws. None of the methods of dealing with backflow prevention described offers a viable solution to the problem of backflow prevention.

One problem that backflow preventers attempt to deal with is that if backflow occurs, contamination of the fluid's source may result. In the case of the public drinking water supply, contamination with chemicals has in fact led to mass illness, and even death. Instances can be sited where backsiphonage has let to ingestion of lethal chemicals by unknowingly drinking from a contaminated drinking water supply. This example merely highlights the need for, and seriousness, of adequate backflow protection. Therefore, it is imperative that the functional state of a backflow preventer be determined simply, easily and reliably. A device with a built-in test method provides a degree of assurance that backflow will be prevented. Such a device represents a substantial milestone in the field of backflow prevention. One or more shortcomings of the prior art will become apparent from a consideration of the drawings and ensuing descriptions.

SUMMARY

One version of Backflow Preventer with Failure Indicator is comprised of pressure gage, drain valve, and check valve between two flow regulating valves. Backflow Preventer with Failure Indicator can take many forms.

DESCRIPTION AND OPERATION OF FIGURES

Figure 1:
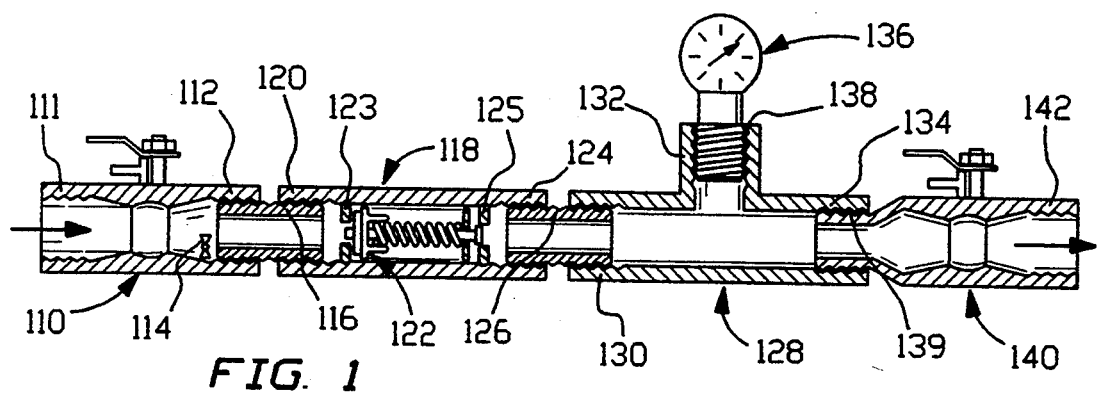
FIG. 1 shows a cutaway side view of a single check valve backflow preventer with a pressure gauge downstream of a check valve.

FIG. 1 - Description

A backflow preventer with failure indicator is a means to determine when failure of backflow preventer's functional capability occur. FIG. 1 shows a cutaway side view of a single check valve version of my backflow preventer with failure indicator; it has a pressure gauge downstream of a check valve. An inlet fluid flow regulating means, inlet fluid flow valve, valve, or ball valve 110 has a downstream fluid pressure relief means, an integral T-handle pet cock, drain plug, or downstream drain valve 114. A source of supply of ball valve 110 is Watts Regulator Company. Ball valve 110 has a female threaded connection 111 and a female threaded connection 112 on its ends by which to join it to a nipple, male threaded coupler of circular cross section, or threaded coupler 116. Threaded coupler 116 is joined to a check valve means, check valve assembly of circular cross section or check valve assembly 118 via a female threaded connection 120. Check valve assembly 118 is identical in description and operation to that of FIG. 2A. Check valve assembly 118 includes a spring-loaded check valve 122. Spring-loaded check valve 122 lies between a stopper 123 and a stopper 125. Check valve assembly 118 has a female threaded connection 120 and a female threaded connection 124 on its ends. A three-way connection or tee 128 has a female threaded connection 130, a female threaded connection 132, and a female threaded connection 134 on its ends. Tee 128 joins check valve assembly 118 via female threaded connection 124 and a nipple, male threaded connection of circular cross section, or threaded coupler 126. Female threaded connection 132 joins to a fluid pressure indicating means, gage, indicator, or pressure gauge 136 via a male threaded connection 138 of pressure gauge 136. Tee 128 is joined to an outlet fluid flow regulating means, outlet fluid flow valve or ball valve 140. Ball valve 140 has a male threaded connection 139 on one end and a female threaded connection 142 on its other. Tee 128 is joined to ball valve 140 via female threaded connection 134 and male threaded connection 139. Note that the terms 'check valve' and 'check valve assembly' are often synonyms.
The embodiment represented by FIG. 1 is a preferred embodiment.

FIG. 1 - Operation

Under normal operating conditions, under which it is not desired to determine the functionality of check valve assembly 118, both ball valve 110 and ball valve 140 are fully open; drain plug 114 is closed. Thus, working fluid is allowed to flow from an area of higher pressure to an area of lower pressure. Working fluid may enter the assembly at ball valve 110, then travel into check valve assembly 118 via threaded coupler 116. Fluid flows within cylindrical pipe, or chamber. As it enters check valve assembly 118, spring-loaded check valve 122 is unseated from stopper 123. Stopper 125 prevents motion of entire spring-loaded check valve 122. More will be said of spring-loaded check valves in the Description and Operation sections of FIGS. 2 and 2A. Working fluid may then travel into tee 128 via threaded coupler 126. Working fluid may then pass through ball valve 140. If a backflow-causing condition exists, spring-loaded check valve 122 seats against stopper 123. If the seal between spring-loaded check valve 122 and stopper 123 is good, backflow generally does not occur. If the seal between spring-loaded check valve 122 and stopper 123 is bad or fouled, backflow generally occurs.

In order to determine the functional state of check valve assembly 118, close ball valve 140; then close ball valve 110. Drain plug 114 is opened. The pressure in pressure gauge 136 descends until spring-loaded check valve 122 is seated. By opening drain plug 114, some working fluid between ball valve 110 and stopper 123 drains out. If spring-loaded check valve 122's seat with stopper 123 is good, the pressure in pressure gauge 136 should not descend further, as pressure is maintained. If check valve 122's seat with stopper 123 is bad or fouled, the pressure in pressure gauge 136 should descend as a further amount of working fluid drains out of drain plug 114.

Check valve assembly 118 can be serviced, repaired, or replaced if found to be defective.

Figure 2:
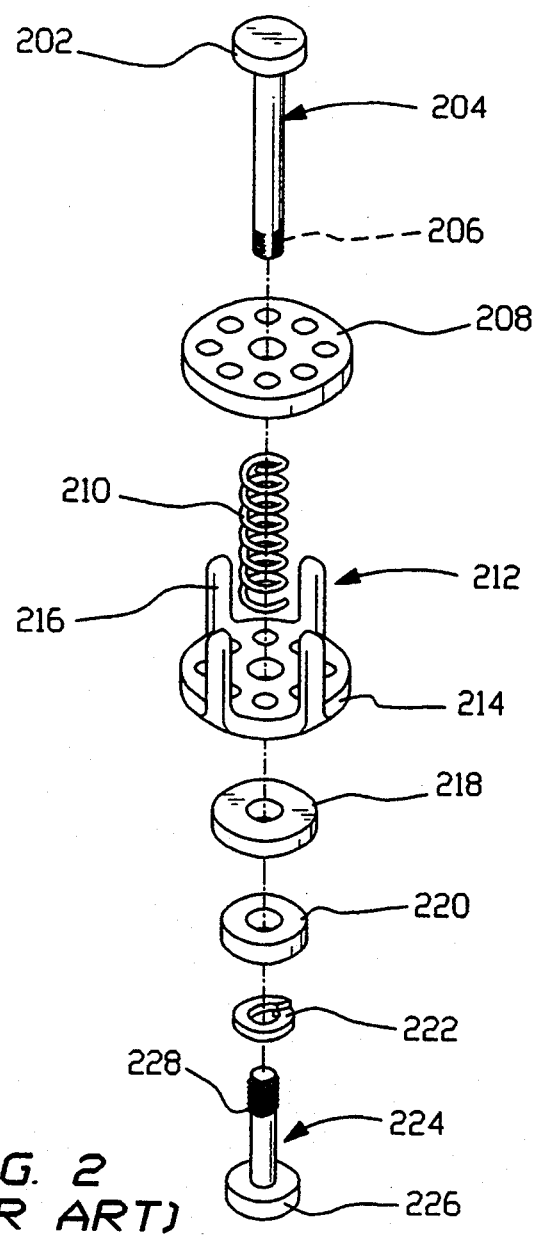
FIG. 2 shows an exploded view in detail of a spring-loaded check valve as indicated in FIGS. 1, 2A, 3, 4, 5, 6, and 7.

FIG. 2 - Description

Figure 2A:
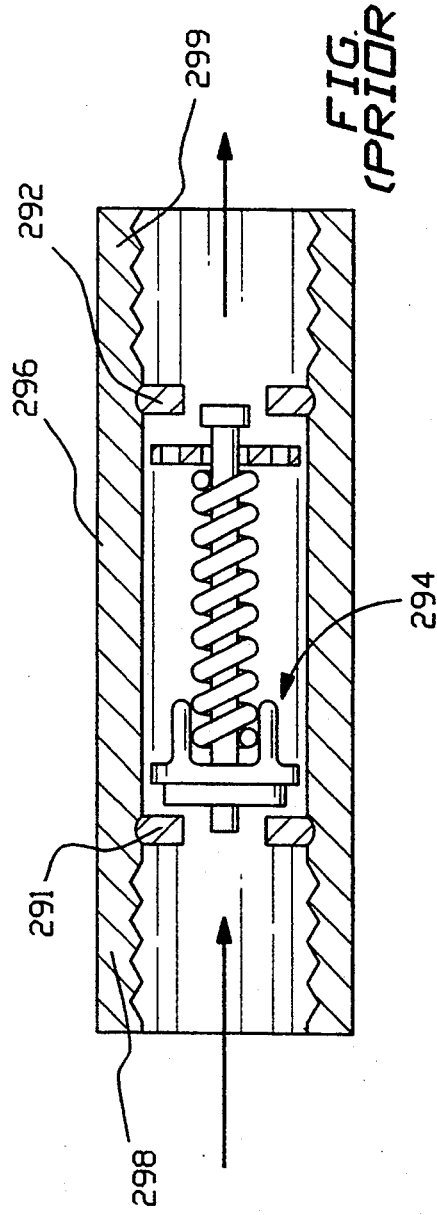
FIG. 2A shows a cutaway view of a check valve assembly including a spring-loaded check valve and an outer pipe casing.

FIG. 2 shows an exploded view in detail of a spring-loaded check valve. FIGS. 2 and 2A are presented to further the reader's understanding of check valves and is intended only as an example; details are provided only to further this understanding and are not intended to be comprehensive as check valves are a common member of the prior art; spring-loaded check valves, and other backflow prevention devices, are readily available and can take may different forms.

A stainless steel rod of circular cross section or shaft 204 has a flat circular head 202 on one end and a female threaded connection 206 on the other. A flat stainless steel plate or passage plate 208 has a center hole and eight equally spaced holes inside its perimeter but which do not extend to the center hole. A spring 210 is a stainless steel helical compression spring. When assembled as in FIG. 2A, one pound per square inch of pressure from a working fluid is not enough to deflect spring 210. A one-piece stainless steel slider or slider 212 is composed of 1) a base 214: a flat circular plate with a center hole and eight equally spaced holes just inside its perimeter but which extend no closer to its center hole than the outside radius of a flat, circular rubber gasket or washer 218. Washer 218 has a center hole. 2) a four prong stainless steel member with four equally spaced prongs integral, and extending perpendicular, to the outside radius of base 214 or slider-arm 216. A flat, stainless steel circular washer or washer 220 has a center hole. A stainless steel lock washer with a center hole is also referred to as lock washer 222. A bolt 224 has a male threaded connection 228 on one end and a flat circular head with a groove, suitable to be turned with a flat-head screwdriver or head 226, on the other. Male threaded connection 228 is suitable to join female threaded connection 206.

FIG. 2A - Description

FIG. 2A shows a check valve assembly including a spring-loaded check valve and an outer pipe casing. As detailed by FIG. 2, a check valve or spring-loaded check valve 294 lies between a flat stainless steel circular disk with a center hole or stopper 291 and a flat stainless steel circular disk with a center hole or stopper 292. The center hole of stopper 292 exposes the eight equally spaced holes of passage plate 208 to allow fluid to flow through. The outside radius of stopper 291, and the outside radius of stopper 292 both equal the inside radius of, and is integral to, a stainless steel outer pipe casing of circular cross section or pipe enclosure 296. Pipe enclosure 296 has a female threaded connection 298 and a female threaded connection 299 on its ends, both of which are normal pipe threads. Washer 218 seats against stopper 291; one pound per square inch of pressure from a working fluid is not enough to unseat washer 218 from stopper 291. Spring-loaded check valve assemblies similar in function to that of FIG. 2A are a member of the prior art.

FIG. 2A - Operation

Note that this section refers to Descriptions of FIG. 2, and FIG. 2A.

When working fluid flows into a spring-loaded check valve assembly through stopper 291, it forces an assembly composed of slider 212, washer 218, washer 220, lock washer 222, and bolt 224 to compress spring 210. Thus, washer 218 unseats from stopper 291 allowing working fluid to pass through stopper 291 and the holes in base 214; shaft 204 rides through the center hole in passage plate 208; slider-arm 216 guides the ensuing motion. Working fluid then passes through the eight equally spaced holes in passage plate 208, and through stopper 292. Stopper 292 prevents motion of the entire assembly. When working fluid is not flowing through the spring-loaded check valve assembly, spring 210 is no longer compressed. Thus, washer 218 seats on stopper 291. Therefore a seal is made between stopper 291 and washer 218. Under backflow-causing conditions, the seal between washer 218, and stopper 291 is intended to prevent fluid flow in the direction opposite that of the normal direction of fluid flow.

Figure 3:
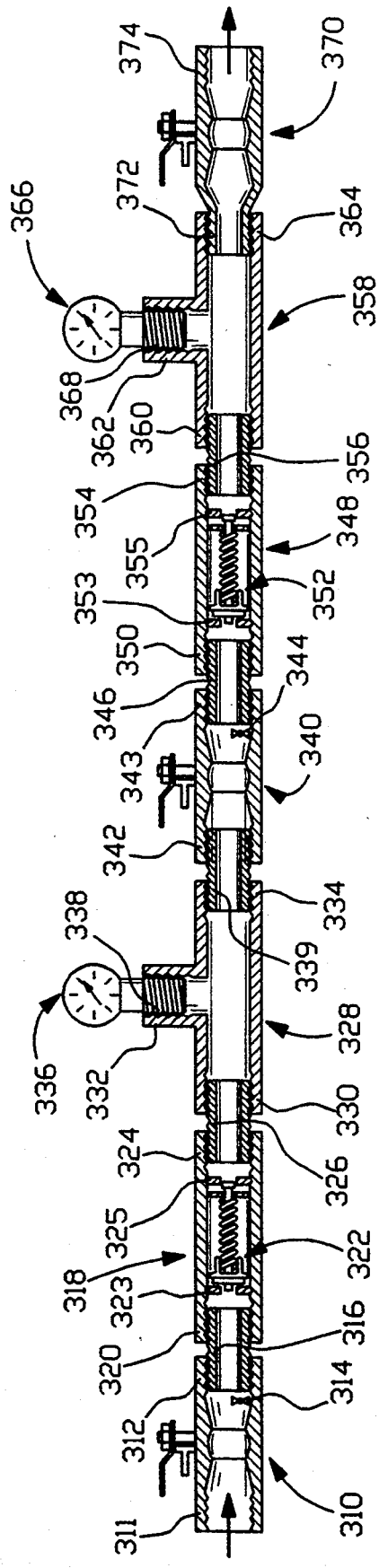
FIG. 3 shows a cutaway side view of a double check valve backflow preventer with a pressure gauge downstream of each check valve.

FIG. 3 - Description

FIG. 3 shows a cutaway side view of a double check valve version of my backflow preventer with failure indicator; it has a pressure gauge downstream of each check valve. A valve or ball valve 310 has an integral T-handle pet cock or drain plug 314. A source of supply of ball valve 310 is Watts Regulator Company. Ball valve 310 has a female threaded connection 311 and a female threaded connection 312 on its ends by which it is joined to a nipple, male threaded coupler of circular cross section or threaded coupler 316. A check valve assembly of circular cross section or check valve assembly 318 has a female threaded connection 320 and a female threaded connection 324 on its ends. Check valve assembly 318 is identical in description and operation to that of FIG. 2A. Threaded coupler 316 is joined to check valve assembly 318 via female threaded connection 320. Check valve assembly 318 includes a spring-loaded check valve 322. Spring-loaded check valve 322 lies between a stopper 323 and a stopper 325. A three-way connection or tee 328 has a female threaded connection 330, a female threaded connection 332, and a female threaded connection 334 on its ends. Tee 328 joins check valve assembly 318 via a male threaded coupler of circular cross section or threaded coupler 326. Female threaded connection 332 joins to a gage, indicator, or pressure gauge 336 via a male threaded connection 338 of pressure gauge 336. Tee 328 is joined to a valve or ball valve 340 via a nipple, male threaded coupler of circular cross section or threaded coupler 339. Ball valve 340 has a female threaded connection 342 and a female threaded connection 343 on its ends. Ball valve 340 has an integral T-handle pet cock or drain plug 344. A source of supply of ball valve 340 is Watts Regulator Company. Ball valve 340 is connected to a check valve assembly of circular cross section or check valve assembly 348. Check valve assembly 348 is identical in description and operation to that of FIG. 2A. Check valve assembly 348 has a female threaded connection 350 and a female threaded connection 354 on its ends. A nipple, male threaded coupler of circular cross section or threaded coupler 346 joins to female threaded connection 350. Female threaded connection 343 joins to threaded coupler 346. Check valve assembly 348 includes a spring-loaded check valve 352. Spring-loaded check valve 352 lies between a stopper 353 and a stopper 355. Check valve assembly 348 is joined to a three-way connection or tee 358. Tee 358 has a female threaded connection 360, a female threaded connection 362, and a female threaded connection 364 on its ends. A nipple, male threaded connection of circular cross section or threaded coupler 356 joins female threaded connection 354 and female threaded connection 360. Female threaded connection 362 joins to a gage, indicator, or pressure gauge 366 via a male threaded connection 368 of pressure gauge 366. A valve or ball valve 370 has a male threaded connection 372 on one end and a female threaded connection 374 on its other. Ball valve 370 joins to tee 358 via female threaded connection 364 and male threaded connection 372.

FIG. 3 - Operation

Under normal operating conditions, under which it is not desired to determine the functionality of check valve assembly 318 or check valve assembly 348, ball valve 310, ball valve 340, and ball valve 370 are fully open; drain plug 314 and drain plug 344 are closed. Working fluid may enter the assembly shown at ball valve 310, then travel into check valve assembly 318 via threaded coupler 316. Working fluid may enter check valve assembly 318, unseating spring-loaded check valve 322 from stopper 323 and travel into tee 328 via threaded coupler 326. Working fluid passes through threaded coupler 339, ball valve 340, threaded coupler 346 and into check valve assembly 348, unseating spring-loaded check valve 352 from stopper 353, and then travel into tee 358, via threaded coupler 356. Working fluid may then pass through ball valve 370. Stopper 325 and stopper 355 prevent motion of entire spring-loaded check valve 322 and entire spring-loaded check valve 352, respectively. If a backflow-causing condition exists, spring-loaded check valve 322 may seat against stopper 323 and spring-loaded check valve 352 may seat against stopper 353. If the resulting seals between these surfaces are good, backflow generally does not occur.

a) In order to determine the functional state of check valve assembly 318, close ball valve 340; then close ball valve 310. Drain plug 314 is opened. The pressure in pressure gauge 336 decreases slightly as spring-loaded check valve 322 is seated against stopper 323. By opening drain plug 314, some working fluid between ball valve 310 and stopper 323 drains out. If spring-loaded check valve 322's seat against stopper 323 is good, the pressure in pressure gauge 336 should not descend further, as pressure is maintained. If spring-loaded check valve 322's seat against stopper 323 is bad or fouled, the pressure in pressure gauge 336 should descend further, as a further amount of working fluid drains out of drain plug 314.

b) In order to determine the functional state of check valve assembly 348, close ball valve 370; then close ball valve 340. Open drain plug 344. The pressure in pressure gauge 366 decreases slightly as spring-loaded check valve 352 is seated against stopper 353. By opening drain plug 344, some working fluid between ball valve 340 and stopper 353 drains out. If spring-loaded check valve 352's seat against stopper 353 is good, the pressure in pressure gauge 366 should not descend further, as pressure is maintained. If check valve 352's seat against stopper 353 is bad or fouled, the pressure in pressure gauge should descend, as a further amount of working fluid drains out of drain plug 344.

Check valve assembly 318 or check valve assembly 348 can be serviced, repaired, or replaced if found to be defective.

Figure 4:
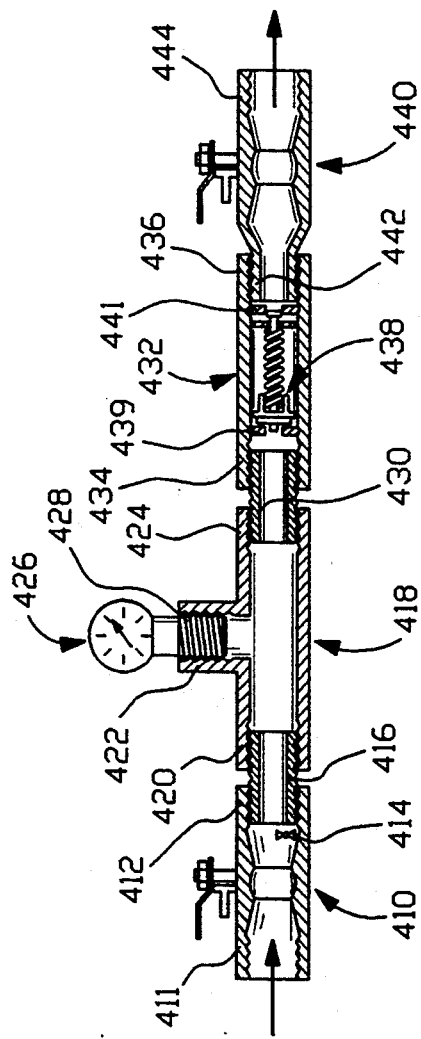
FIG. 4 shows a cutaway side view of a single check valve backflow preventer with a pressure gauge upstream of a check valve.

FIG. 4 - Description

FIG. 4 shows a cutaway side view of a single check valve version of my backflow preventer with failure indicator; it has a pressure gauge upstream of a check valve. A valve or ball valve 410 has an integral T-handle pet cock or drain plug 414. A source of supply of ball valve 410 is Watts Regulator Company. Ball valve 410 has a female threaded connection 411 and a female threaded connection 412 on its ends by which it is joined to a nipple, male threaded coupler of circular cross section, or threaded coupler 416. Threaded coupler 416 is joined to a three-way connection or tee 418. Tee 418 has a female threaded connection 420, a female threaded connection 422, and a female threaded connection 424 on its ends. Female threaded connection 422 joins to a gage, indicator, or pressure gauge 426 via a male threaded connection 428 of pressure gauge 426. Female threaded connection 424 is connected to a nipple, male threaded coupler of circular cross section, or threaded coupler 430. Threaded coupler 430 is connected to a check valve assembly of circular cross section or check valve assembly 432. Check valve assembly 432 is identical in description and operation to that of FIG. 2A. Check valve assembly 432 includes a spring-loaded check valve 438. Spring-loaded check valve 438 lies between a stopper 439 and a stopper 441. Check valve assembly 432 has a female threaded connection 434 and a female threaded connection 436 on its ends. Check valve assembly 432 is connected to a valve or ball valve 440; ball valve 440 has a male threaded connection 442 by which it attaches to female threaded connection 436. Ball valve 440 has a female threaded connection 444 on its other end.

FIG. 4 - Operation

Under normal operating conditions, under which it is not desired to determine the functionality of check valve assembly 432, ball valve 410 and ball valve 440 are fully open; drain plug 414 is closed. Working fluid may enter the assembly shown through ball valve 410, then into tee 418 via threaded coupler 416. Working fluid may then enter check valve assembly 432 via threaded coupler 430. As working fluid enters check valve assembly 432, spring-loaded check valve 438 is unseated from stopper 439 and travels into ball valve 440. Stopper 441 prevents motion of entire spring-loaded check valve 438. If a backflow-causing condition exists, spring-loaded check valve 438 seats against stopper 439. If the seal between spring-loaded check valve 438 and stopper 439 is good, backflow generally does not occur. If the seal between spring-loaded check valve 438 and stopper 439 is bad or fouled, backflow generally occurs.

In order to determine the functional state of check valve assembly 432, close ball valve 440; then close ball valve 410. Open drain plug 414 until the pressure in pressure gauge 426 decreases;then close drain plug 414. Spring-loaded check valve 438 seats against stopper 439. Open ball valve 440 allowing pressure to test spring-loaded check valve 438's seat against stopper 439. If spring-loaded check valve 438's seat against stopper 439 is good, the pressure in pressure gauge 426 should not rise; if check valve 438's seat against stopper 439 is bad or fouled, the pressure in pressure gauge 426 should rise.

Check valve assembly 432 can be serviced, repaired, or replaced if found to be defective.

Figure 5:
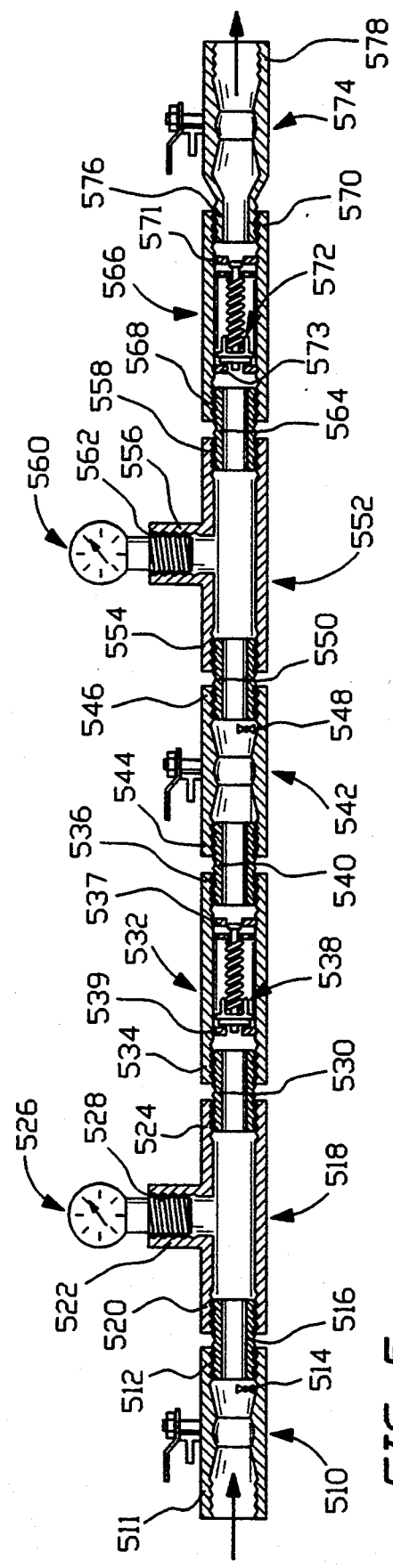
FIG. 5 shows a cutaway side view of a double check valve backflow preventer with a pressure gage upstream of each check valve.

FIG. 5 - Description

FIG. 5 shows a cutaway side view of a double check valve version of my backflow preventer with failure indicator; it has a pressure gauge upstream of each check valve. A valve or ball valve 510 has an integral T-handle pet cock or drain plug 514. A source of supply of ball valve 510 is Watts Regulator Company. Ball valve 510 has a female threaded connection 511 and a female threaded connection 512 on its ends by which it is joined to a nipple, male threaded coupler of circular cross section, or threaded coupler 516. Threaded coupler 516 is joined to a three-way connection or tee 518. Tee 518 has a female threaded connection 520, a female threaded connection 522, and a female threaded connection 524 on its ends. Female threaded connection 522 joins to a gage, indicator, or pressure gauge 526 via a male threaded connection 528 of pressure gauge 526. Female threaded connection 524 is connected to a nipple, male threaded coupler of circular cross section, or threaded coupler 530. Threaded coupler 530 is connected to a check valve assembly of circular cross section or check valve assembly 532. Check valve assembly 532 is identical in description and operation to that of FIG. 2A. Check valve assembly 532 includes a spring-loaded check valve 538. Spring-loaded check valve 538 lies between a stopper 539 and a stopper 537. Check valve assembly 532 has a female threaded connection 534 and a female threaded connection 536 on its ends. Threaded coupler 530 joins to female threaded connection 534. Check valve assembly 532 is connected to a nipple, male threaded coupler of circular cross section or threaded coupler 540. An intermediate fluid flow valve, or ball valve 542 has a female threaded connection 544 and a female threaded connection 546 on its ends. Female threaded connection 544 joins to threaded coupler 540. Ball valve 542 has an integral T-handle pet cock or drain plug 548. A source of supply of ball valve 542 is Watts Regulator Company. Female threaded connection 546 is connected to a nipple, male threaded coupler of circular cross section, or threaded coupler 550. The length of threaded coupler 550 is twice that of threaded coupler 516. Threaded coupler 550 is joined to a three-way connection or tee 552. Tee 552 has a female threaded connection 554, a female threaded connection 556, and a female threaded connection 558 on its ends. Threaded coupler 550 joins to female threaded connection 554. Female threaded connection 556 joins to a gage, indicator, or pressure gauge 560 via a male threaded connection 562 of pressure gauge 560. Female threaded connection 558 is connected to a nipple, male threaded coupler of circular cross section, or threaded coupler 564. Threaded coupler 564 is connected to a check valve assembly of circular cross section or check valve assembly 566. Check valve assembly 566 is identical in description and operation to that of FIG. 2A. Check valve assembly 566 includes a spring-loaded check valve 572. Spring-loaded check valve 572 lies between a stopper 573 and a stopper 571. Check valve assembly 566 has a female threaded connection 568 and a female threaded connection 570 on its ends. Check valve assembly 566 is connected to a valve or ball valve 574; ball valve 574 has a male threaded connection 576 by which it attaches to female threaded connection 570. Ball valve 574 has a female threaded connection 578 on its other end.

FIG. 5 - Operation

Under normal operating conditions, under which it is not desired to determine the functionality of check valve assembly 532 or check valve assembly 566, ball valve 510, ball valve 542, and ball valve 574 are fully open; drain plug 514, and drain plug 548 are closed. Working fluid may enter the assembly shown through ball valve 510. It may then travel into tee 518 via threaded coupler 516. Working fluid may then enter check valve assembly 532 via threaded coupler 530. Working fluid enters check valve assembly 532, unseating spring-loaded check valve 538 from stopper 539, and travels into ball valve 542 via threaded coupler 540; it then travels into tee 552 via threaded coupler 550. Working fluid may then enter check valve assembly 566 via threaded coupler 564 unseating spring-loaded check valve 572 from stopper 573; then it may travel through ball valve 574. Stopper 537 and stopper 571 prevent motion of entire check valve 538 and entire check valve 572, respectively. If a backflow-causing condition exists, spring-loaded check valve 538 may seat against stopper 539, and spring-loaded check valve 572 may seat against stopper 573. If the resulting seals between these surfaces are good, backflow generally does not occur; if the resulting seals between these surfaces are bad or fouled, backflow generally occurs.

a) In order to determine the functional state of check valve assembly 532, close ball valve 542, then close ball valve 510. Open drain plug 514 until the pressure in pressure gauge 526 descends; then close drain plug 514. Spring-loaded check valve 538 is seated. Open ball valve 542 allowing pressure to test spring-loaded check valve 538's seat against stopper 539. If spring-loaded check valve 538's seat is good, the pressure in pressure gauge 526 should not rise. If check valve 538's seat is bad or fouled, the pressure in pressure gauge 526 should rise.

b) In order to determine the functional state of check valve assembly 566, close ball valve 542, then close ball valve 574. Open drain plug 548 until the pressure in pressure gauge 560 descends; then close drain plug 548. Spring-loaded check valve 572 is seated against stopper 573. Open ball valve 574 allowing pressure to test spring-loaded check valve 572's seat against stopper 573. If spring-loaded check valve 572's seat against stopper 573 is good, the pressure in pressure gauge 560 should not rise. If spring-loaded check valve 572's seat against stopper 573 is bad or fouled, the pressure in pressure gauge 560 should rise.

Check valve assembly 532 or check valve assembly 566 can be serviced, repaired, or replaced if found to be defective.

Figure 6:
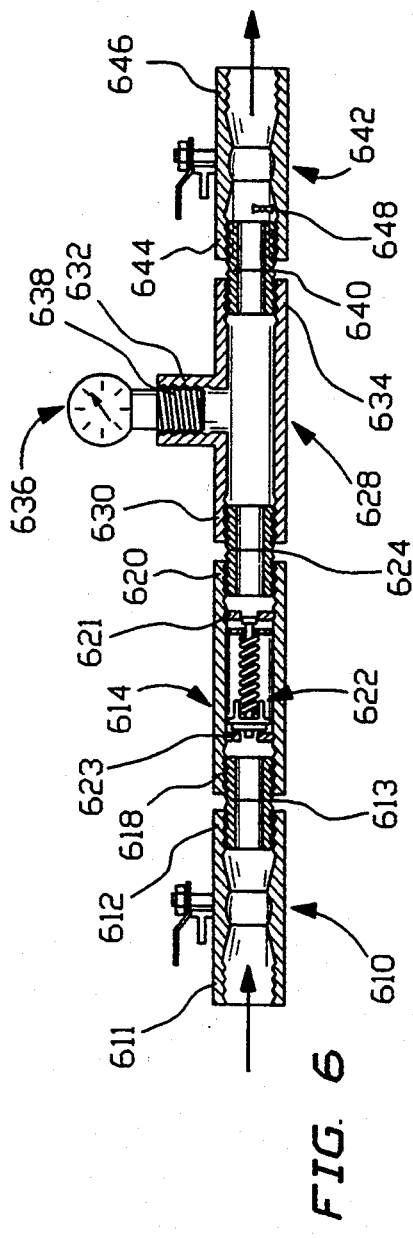
FIG. 6 shows a cutaway side view of another version of a single check valve backflow preventer with a pressure gauge downstream of a check valve.

FIG. 6 - Description

FIG. 6 shows a cutaway side view of another single check valve version of my backflow preventer with failure indicator; it has a pressure gauge downstream of a check valve. A valve or ball valve 610 has a female threaded connection 611 and a female threaded connection 612 on its ends by which it connects to a nipple, male threaded coupler of circular cross section, or threaded coupler 613. Threaded coupler 613 is joined to a check valve assembly of circular cross section or check valve assembly 614 via a female threaded connection 618 of check valve assembly 614. Check valve assembly 614 is identical in description and operation to that of FIG. 2A. Check valve assembly 614 includes a spring-loaded check valve 622. Spring-loaded check valve 622 lies between a stopper 623 and a stopper 621. Check valve assembly 614 has a female threaded connection 620 on its other end. A three-way connection or tee 628 has a female threaded connection 630, a female threaded connection 632, and a female threaded connection 634 on its ends. Tee 628 joins check valve assembly 614 via a nipple, male threaded coupler of circular cross section, or threaded coupler 624. Female threaded connection 632 joins to a gage, indicator, or pressure gauge 636 via a male threaded connection 638 of pressure gauge 636. Tee 628 is joined to a valve or ball valve 642 via a nipple, male threaded coupler of circular cross section or threaded coupler 640. Ball valve 642 has a female threaded connection 644 and a female threaded connection 646 on its ends. Female threaded connection 644 joins to threaded coupler 640. Ball valve 642 has an integral T-handle pet cock or drain plug 648. A source of supply of ball valve 642 is Watts Regulator Company.

FIG. 6 - Operation

Under normal operating conditions, under which it is not desired to determine the functionality of check valve assembly 614, ball valve 610 and ball valve 642 are fully open; drain plug 648 is closed. Working fluid may enter the assembly shown through ball valve 610, then travel into check valve assembly 614 via threaded coupler 613 unseating spring-loaded check valve 622 from stopper 623. Working fluid then travels into tee 628 via threaded coupler 624. Working fluid may then enter ball valve 642 via threaded coupler 640. Stopper 621 prevents motion of entire spring-loaded check valve 622. If a backflow-causing condition occurs, spring-loaded check valve 622 seats against stopper 623. If the seal between spring-loaded check valve 622 and stopper 623 is good, backflow generally does not occur. If the seal between spring-loaded check valve 622 and stopper 623 is bad or fouled, backflow generally occurs.

In order to determine the functional state of check valve assembly 614, close ball valve 610, then close ball valve 642. Open drain plug 648 until the pressure in pressure gauge 636 descends; then close drain plug 648.

Spring-loaded check valve 622 is seated against stopper 623. Open valve 610 enough to allow only 1 pound per square inch of pressure to test spring-loaded check valve 622's seat against stopper 623. This amount of pressure is not enough to overcome spring-loaded check valve 622's spring force. Thus, if spring-loaded check valve 622's seat against stopper 623 is good, the pressure in pressure gauge 636 should not rise. If check valve 622's seat against stopper 623 is bad or fouled, the pressure in pressure gauge 636 should rise.

Check valve assembly 614 can be serviced, repaired, or replaced if found to be defective.

Figure 7:
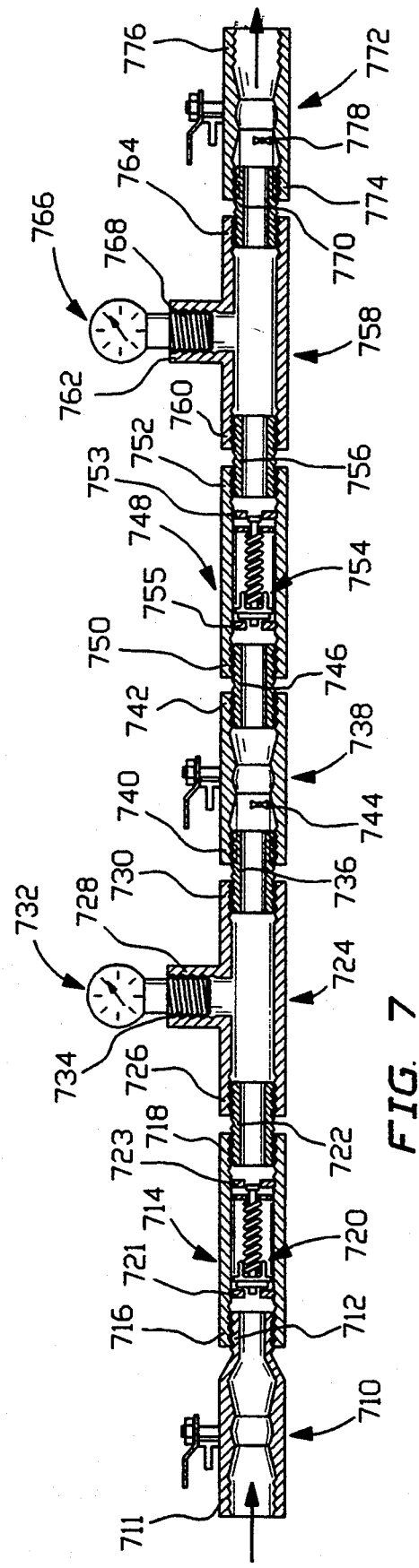
FIG. 7 shows a cutaway side view of another version of a double check valve backflow preventer with a pressure gauge downstream of each check valve.

FIG. 7 - Description

FIG. 7 shows a cutaway side view of another double check valve version of my backflow preventer with failure indicator; it has a pressure gauge downstream of each check valve. A valve or ball valve 710 has a female threaded connection 711 on one end and a male threaded connection 712 on its other by which it connects to a check valve assembly of circular cross section or check valve assembly 714. Check valve assembly 714 is identical in description and operation to that of FIG. 2A. Check valve assembly 714 includes a spring-loaded check valve 720. Spring-loaded check valve 720 lies between a stopper 721 and a stopper 723. Check valve assembly 714 has a female threaded connection 716 and a female threaded connection 718 on its ends. A three-way connection or tee 724 has a female threaded connection 726, a female threaded connection 728, and a female threaded connection 730 on its ends. A nipple, male threaded coupler of circular cross section or threaded coupler 722 joins female threaded connection 718 and female threaded connection 726. Female threaded connection 728 joins to a gage, indicator, or pressure gauge 732 via a male threaded connection 734 of pressure gauge 732. Tee 724 is joined to a valve or ball valve 738 via a nipple, male threaded coupler of circular cross section, or threaded coupler 736. Ball valve 738 has an integral T-handle pet cock or drain plug 744 and a female threaded connection 740 and a female threaded connection 742 on its ends. A source of supply of ball valve 738 is Watts Regulator Company. Female threaded connection 742 is connected to a nipple, male threaded coupler of circular cross section or threaded coupler 746. Threaded coupler 746 is connected to a check valve assembly of circular cross section or check valve assembly 748 via a female threaded connection 750. Check valve assembly 748 is identical in description and operation to that of FIG. 2A. Check valve assembly 748 includes a spring-loaded check valve 754. Spring-loaded check valve 754 lies between a stopper 755 and a stopper 753. Check valve assembly 748 has female threaded connection 750 and a female threaded connection 752 on its ends. A nipple, male threaded coupler of circular cross section, or threaded coupler 756 joins to female threaded connection 752. A three-way connection or tee 758 has a female threaded connection 760, a female threaded connection 762, and a female threaded connection 764 on its ends. Threaded coupler 756 joins to female threaded connection 760. Female threaded connection 762 joins to a gage, indicator, or pressure gauge 766 via a male threaded connection 768 of pressure gauge 766. Tee 758 is joined to a valve or ball valve 772 via a nipple, male threaded coupler of circular cross section, or threaded coupler 770. Ball valve 772 has a female threaded connection 774 and a female threaded connection 776 on its ends and has an integral T-handle pet cock or drain plug 778. A source of supply of ball valve 772 is Watts Regulator Company.

FIG. 7 - Operation

Under normal operating conditions, under which it is not desired to determine the functionality of check valve assembly 714 or check valve assembly 748, ball valve 710, ball valve 738, and ball valve 772 are fully open; drain plug 744 and drain plug 778 are closed. Working fluid may enter the assembly shown at ball valve 710, and then travel into check valve assembly 714 unseating spring-loaded check valve 720 from stopper 721; it then can travel into tee 724 via threaded coupler 722. Working fluid may then enter ball valve 738 via threaded coupler 736. Working fluid may then enter check valve assembly 748 via threaded coupler 746 unseating spring-loaded check valve 754 from stopper 755. It may then travel into tee 758 via threaded coupler 756. Working fluid may then enter ball valve 772 via threaded coupler 770. Stopper 723 and stopper 753 prevent motion of entire spring-loaded check valve 720 and entire spring-loaded check valve 754, respectively. If a backflow-causing condition occurs, spring-loaded check valve 720 may seat against stopper 721, and spring-loaded check valve 754 may seat against stopper 755. If the resulting seals between these surfaces are good, backflow generally does not occur. If the resulting seals between these surfaces are bad or fouled, backflow generally occurs.

a) In order to determine the functionality of check valve assembly 748, close ball valve 738, then close ball valve 772. Open drain plug 778 until the pressure in pressure gauge 766 descends; then close drain plug 778. Spring-loaded check valve 754 is seated. Open ball valve 738 allowing only 1 pound per square inch pressure to test spring-loaded check valve 754's seat against stopper 755. This amount of pressure is not enough to overcome spring-loaded check valve 754's spring force. Thus, if spring-loaded check valve 754's seat against stopper 755 is good, the pressure in pressure gauge 766 should not rise. If check valve 754's seat against stopper 755 is bad or fouled, the pressure in pressure gauge 766 should rise.

b) In order to determine the functionality of check valve assembly 714, close ball valve 710, then close ball valve 738. Open drain plug 744 until the pressure in pressure gauge 732 descends; then close drain plug 744. Spring-loaded check valve 720 is seated against stopper 721. Open ball valve 710 allowing 1 pound per square inch pressure to test spring-loaded check valve 720's seat against stopper 721. This amount of pressure is not enough to overcome spring-loaded check valve 720's spring force. Thus, if spring-loaded check valve 720's seat against stopper 721 is good, the pressure in pressure gauge 732 should not rise. If spring-loaded check valve 720's seat against stopper 721 is bad or fouled, the pressure in pressure gauge 732 should rise.

Check valve assembly 714 or check valve assembly 748 can be serviced, repaired, or replaced if found to be defective.

Conclusions, Ramifications and Scope of Invention

Thus, the reader will see that the backflow preventer with failure indicator provides a substantial improvement over current methods of dealing with backflow; it provides an integral, built-in indicator to help determine the functional condition of a backflow preventer. The simplicity involved in my invention, as illustrated by the examples of descriptions and operations previously discussed, is of great value; the functional state of the backflow preventer can be easily, and reliably, determined where often there was no reasonable mechanism to determine its functional state or more easily known where there often was a complex, impractical method to determine its functional state. Providing an integral, easy, and reliable test enables backflow preventers to be more readily and widely used. Thus, they help provide a greater level of overall assurance that backflow will be prevented.

Backflow preventers are used in a wide variety of uses including commercial, residential, and otherwise. They can range in size from miniature, for situations where there is a low flow rate or space limitations, to large designs, to accommodate substantial flow rates.

Their applications include use in schools, office buildings, laboratories, apartment buildings, hotels, restaurants, individual homes, medical and health care facilities, gymnasiums, industrial applications, emergency rinsers, sprays, hose stations, mixing units, cleaning stations, faucets, bidets, tubs, spas, shower sprays, washing machines, dishwashers, flushometers, urinals, mixing valves, valves, sprays, lawn and garden care sprays, hose bibs, drinking stations, food stations, bar faucets, chemical processing, petroleum processing, etc. Check valves are used for any multitude of fluids including incompressible fluids as well as compressible ones. It must be stressed how extensive the list of uses and applications actually is.

While my above descriptions contain many specificities, these should not be construed as limitations on the scope of the invention, but rather as an exemplification of some preferred embodiments thereof. Many other variations are possible. I do not consider these versions important enough to show in the drawings or describe in detail in the description. For example, a backflow preventer with failure indicator can include a self-contained version that does not require any working fluid to be discharged from the assembly. Also, a backflow preventer with failure indicator may incorporate other methods used to prevent backflow, such as air vents, vacuum breakers, or reduced pressure zone assemblies, or otherwise. They may also incorporate multiple or redundant backflow prevention devices in tandem or otherwise. They may use other types of flow regulating devices including globe valves, gate valves or otherwise. They may include other mechanical, electronic or electrical devices, including pneumatics, hydraulics, and solenoids or otherwise. They may also use different indicator(s) including other mechanical, physical, electronic, or electric. Indicators can include needle-type pressure gage(s), or electronic pressure gage(s). They may use different types of indicators in one design. The test procedure can be automated fully or in part.

An example of another mechanical indicator may include a float mechanism, or lockout device which could terminate or restrict fluid flow, or otherwise. An example of another physical indicator includes a design which physically seats the device's check valve(s) and allows pressure from a working fluid to test the functional condition of its check valve(s). For example, if a device's check valve is fouled, working fluid can be emitted to the atmosphere. In some designs a physical indicator is not necessary.

An example of an electric or electronic indicator can include buzzers, warning lights, automated system shutdown, or other indication(s).

Designs can also involve, or include, weighted check valves, other spring-loaded mechanisms, designs utilizing friction, pressure differential, etc.

Drain plug(s) can include T-handle pet cock(s) integral to valve(s), a separate drain plug, automatic relief valve(s), non-fluid-emitting pressure reducers, etc.

Designs often include check valves or other backflow prevention devices which are designed to be readily removed, disassembled, serviced, accessed, or replaced.

Materials can vary widely; metals, polymers, ceramics, composites, etc., can often be substituted. Many parts described as of circular cross section can have other shapes such as oval, trapezoidal, triangular, etc. Chamber and many parts need not be joined with threaded connections; for example sweat or solder fittings, adhesives, etc., could be used. Parts may be eliminated, reduced, consolidated, and/or integral to a simpler design for a variety of reasons including lower material cost, ease of manufacture, or ease of assembly. Colors, textures, etc. could likewise be altered with out significant consequence.

Accordingly, the scope of my invention should be determined not by the embodiments illustrated, but by the appended claims and their legal equivalents.

What is claimed is:

1. A backflow prevention device comprising:
    (a) chamber;
    (b) inlet fluid flow regulating means in chamber;
    (c) outlet fluid flow regulating means in chamber;
    (d) check valve means in chamber disposed between inlet fluid flow regulating means and outlet fluid flow regulating means;
    (e) chamber pressure indicating means disposed between inlet fluid flow regulating means and outlet fluid flow regulating means with means for indicating fluid pressure within chamber; and
    (f) chamber fluid pressure relief means disposed between inlet fluid flow regulating means and outlet fluid flow regulating means.

2. The backflow prevention device of claim 1 wherein said chamber is a cylindrical pipe.

3. The backflow prevention device of claim 1 wherein said inlet fluid flow regulating means is a valve.

4. The backflow prevention device of claim 1 wherein said outlet fluid flow regulating means is a valve.

5. The backflow prevention device of claim 1 wherein said check valve means is a check valve assembly.

6. The backflow prevention device of claim 1 wherein said chamber pressure indicating means is a pressure gage.

7. The backflow prevention device of claim 1 wherein said chamber fluid pressure relief means is a drain valve.

8. A backflow prevention device comprising:
    (a) chamber;
    (b) inlet fluid flow valve in chamber with downstream drain valve;
    (c) outlet fluid flow valve in chamber;
    (d) intermediate fluid flow valve with downstream drain valve in chamber located upstream of outlet fluid flow valve and downstream of inlet fluid flow valve;

(e) pressure gage in chamber downstream of inlet fluid flow valve and upstream of intermediate fluid flow valve;

(f) check valve assembly in chamber upstream of intermediate fluid flow valve and downstream of pressure gage in chamber located downstream of inlet fluid flow valve;

(g) pressure gage in chamber downstream of intermediate fluid flow valve and upstream of outlet fluid flow valve; and (h) check valve assembly in chamber upstream of outlet fluid flow valve and downstream of pressure gage in chamber located downstream of intermediate fluid flow valve.

* * * * *